United States Patent

Pan

(10) Patent No.: US 7,956,673 B2
(45) Date of Patent: Jun. 7, 2011

(54) VARIABLE STAGE CHARGE PUMP AND METHOD FOR PROVIDING BOOSTED OUTPUT VOLTAGE

(75) Inventor: Dong Pan, Boise, ID (US)

(73) Assignee: Micron Technology, Inc., Boise, ID (US)

(*) Notice: Subject to any disclaimer, the term of this patent is extended or adjusted under 35 U.S.C. 154(b) by 35 days.

(21) Appl. No.: 12/189,532

(22) Filed: Aug. 11, 2008

(65) Prior Publication Data

US 2010/0033232 A1    Feb. 11, 2010

(51) Int. Cl.
   *G11C 5/14*    (2006.01)
(52) U.S. Cl. .......................... 327/530; 327/534
(58) Field of Classification Search .................. 327/530, 327/534–536

See application file for complete search history.

(56) References Cited

U.S. PATENT DOCUMENTS

| 6,320,797 | B1 | 11/2001 | Liu | 365/189.11 |
|---|---|---|---|---|
| 6,912,155 | B2* | 6/2005 | Sakurai et al. | 365/185.02 |
| 2006/0114053 | A1* | 6/2006 | Sohara et al. | 327/536 |
| 2006/0132417 | A1* | 6/2006 | Shigenobu et al. | 345/98 |
| 2008/0054944 | A1* | 3/2008 | Kwon | 326/83 |

* cited by examiner

*Primary Examiner* — Lincoln Donovan
*Assistant Examiner* — Diana J Cheng
(74) *Attorney, Agent, or Firm* — Dorsey & Witney LLP

(57) ABSTRACT

An embodiment of a variable stage charge pump includes a plurality of pump stages. Each stage is configured to generate an intermediate boosted output voltage. A pump stage selector selects the number of charge pump stages to be coupled between an input and output terminal of the variable stage charge pump. The pump stage selector may control a plurality of switches to select the number of stages. For example, two stages may be coupled in parallel and the parallel combination coupled in series to a third stage, resulting in a two stage charge pump. For a three stage charge pump, all three stages are coupled in series.

17 Claims, 6 Drawing Sheets

VARIABLE STAGE CHARGE PUMP AND METHOD FOR PROVIDING BOOSTED OUTPUT VOLTAGE

TECHNICAL FIELD

Embodiments of the invention relate generally to charge pump circuits, and particularly, to multiple stage charge pumps.

BACKGROUND OF THE INVENTION

In many electronic circuits, charge pump circuits are utilized to generate a positive pumped voltage having an amplitude greater than that of a positive supply voltage, or to generate a negative pumped voltage. For example, in a conventional dynamic random access memory ("DRAM"), a charge pump circuit may be utilized to generate a boosted word line voltage $V_{CCP}$ having an amplitude greater than the amplitude of a positive supply voltage $V_{CC}$. A negative charge pump circuit may be utilized to generate a negative substrate or back-bias voltage $V_{BB}$ that may be applied to the bodies of NMOS transistors in a DRAM. Another typical application of a charge pump circuit may be the generation of a high voltage utilized to erase data stored in blocks of memory cells or to program data into memory cells in non-volatile electrically block-erasable or "FLASH" memories, as will be understood by those skilled in the art. Other electronic components besides memory devices also may make use of charge pump circuits.

An example of a conventional charge pump circuit 100 is shown in FIG. 1. An oscillating input signal, such as a clock signal, CLK, is applied to an input of an inverter 105. During a first phase of operation, when the CLK signal is high, node A is low, and node B is clamped to $V_{cc}-V_{th}$ by the transistor 110. The voltage difference between Nodes A and B charges a capacitor 115. During a second phase of operation, the CLK signal transitions low, and Node A will transition high. As Node A rises to $V_{CC}$, Node B will begin to rise above $V_{CC}-V_{th}$, due to the charge stored in the capacitor 115. As the Node B voltage rises above $V_{CC}-V_{th}$, the transistor 110 turns off, and transistor 120 turns on. Accordingly, the charge from the capacitor 115 is transferred through the transistor 120 and charges a load capacitor 125, raising the voltage $V_{OUT}$. As the clock signal CLK continues to cycle, the load capacitor 125 continues to charge until the voltage at $V_{OUT}$ equals the peak voltage at Node B. Based on the charge pump circuit shown in FIG. 1, a simple negative voltage pump could be built by substituting PMOS transistors for the NMOS transistors 110 and 120 and moving their respective gate connections, as understood by those skilled in the art.

The simple charge pump circuit shown in FIG. 1 is a single-stage circuit, having only a single charging capacitor 115. The single-stage charge pump of FIG. 1 can generate at most a $V_{CCP}$ voltage equal to twice $V_{CC}$, because the charge across charging capacitor 115 can be at most $V_{CC}$, which stored voltage will be added to the original supply voltage $V_{CC}$. Accordingly, to achieve still higher $V_{CCP}$ voltages, multiple stage charge pumps may be used. A conventional schematic for a stage 200 of a multi-stage charge pump is shown in FIG. 2.

The conventional stage 200 circuit includes inverter 205 and charging capacitor 215, analogous to the inverter 105 and charging capacitor 115 shown in FIG. 1. The transistors 110 and 120 from FIG. 1 are shown as idealized switches 210 and 220, respectively in FIG. 2. A clock signal, CLK, is applied to an input of the inverter 205. During a first, charging, phase, the switch 210 is closed, and a voltage is coupled from a previous stage (or from a source voltage in the case of the first stage) to the charging capacitor 215. During the second phase, as the CLK signal transitions, the switch 220 is closed and the charge stored on the charging capacitor 215 is coupled through to the next stage of the multi-stage charging circuit. Using multiple stages allows a larger voltage to be generated by the charge pump circuit.

Charge pump circuits are characterized in terms of capacity and efficiency—capacity referring to the amount of output current the charge pump supplies, and efficiency referring to either power efficiency (output power divided by input power) or current efficiency (output current divided by input current). The number of pump stages is related to the maximum current efficiency. Due to the charge pump stage architecture, the maximum current efficiency is given as $1/(K+1)$ where K is the number of pump stages. Accordingly, a pump having fewer stages will theoretically have greater maximum current efficiency. Conversely a pump having more stages will have a smaller maximum current efficiency, but will have a greater driving capacity for a given output voltage.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, memory cells, control signals, timing protocols, and software operations have not been shown in detail in order to avoid unnecessarily obscuring the described embodiments of the invention.

As described above, in an ideal charge pump, a circuit having fewer stages would have a greater current efficiency, although a lower driving capacity. However, in practice, charge pump circuitry deviates from the ideal case described. In practice, current losses in the charge pump circuitry due to drivers and other non-ideal components can cause a pump having fewer stages to actually have less current efficiency than a pump having a greater number of stages for a certain supply voltage, particularly lower supply voltages. Many electronic devices that incorporate charge pump circuits utilize several different supply voltages. Accordingly, it would be desirable to alter the number of stages included in the charge pump based on operating conditions of the circuit, such as the supply voltage.

Figure 3:
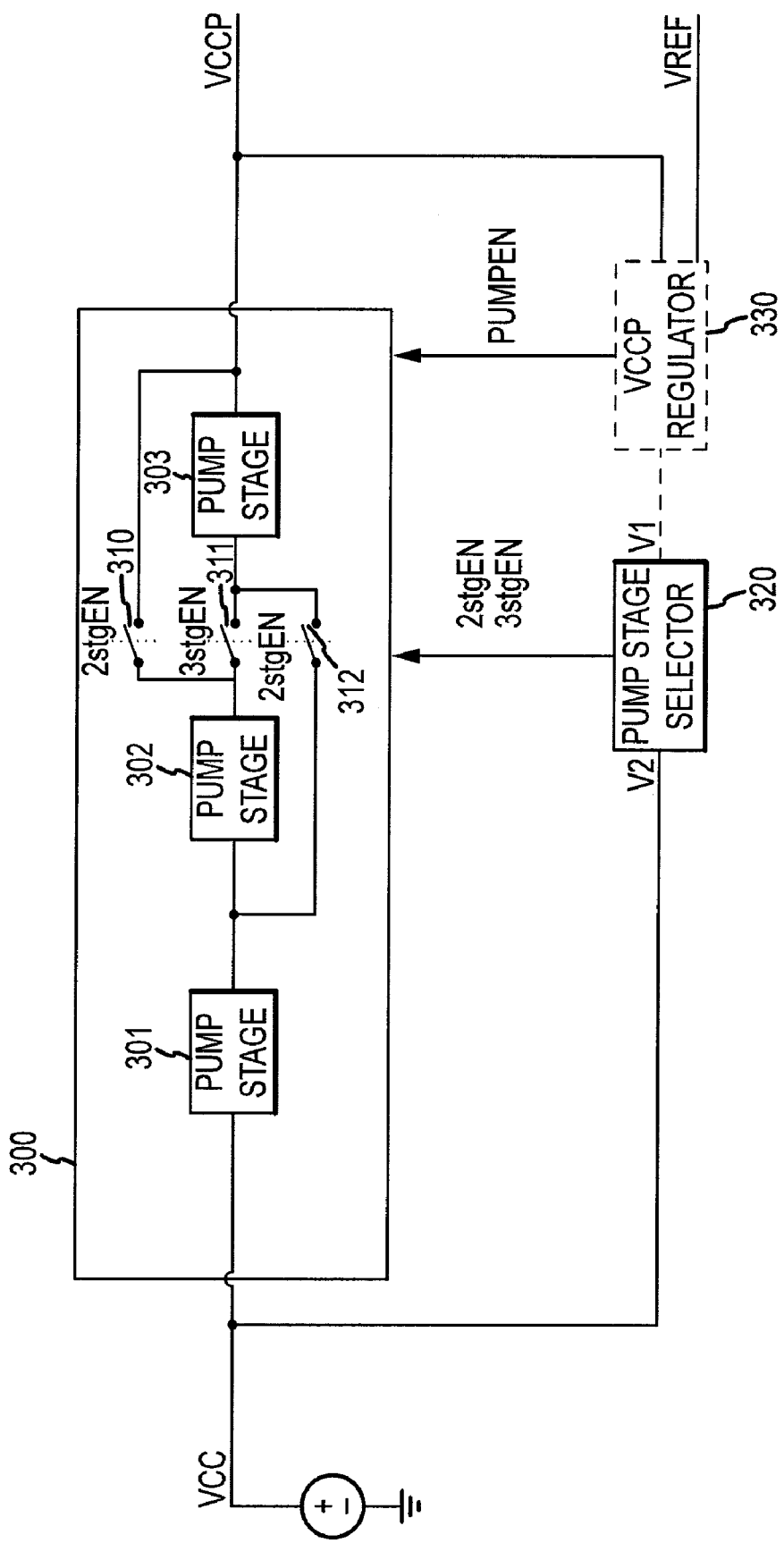
FIG. 3 is a schematic of a variable stage charge pump according to an embodiment of the present invention, where each stage may include the charge pump of FIG. 2.

FIG. 3 depicts an embodiment of charge pump 300 having a variable number of stages. The charge pump circuitry 300 includes a charge pump with three stages 301, 302, and 303.

Figure 1:
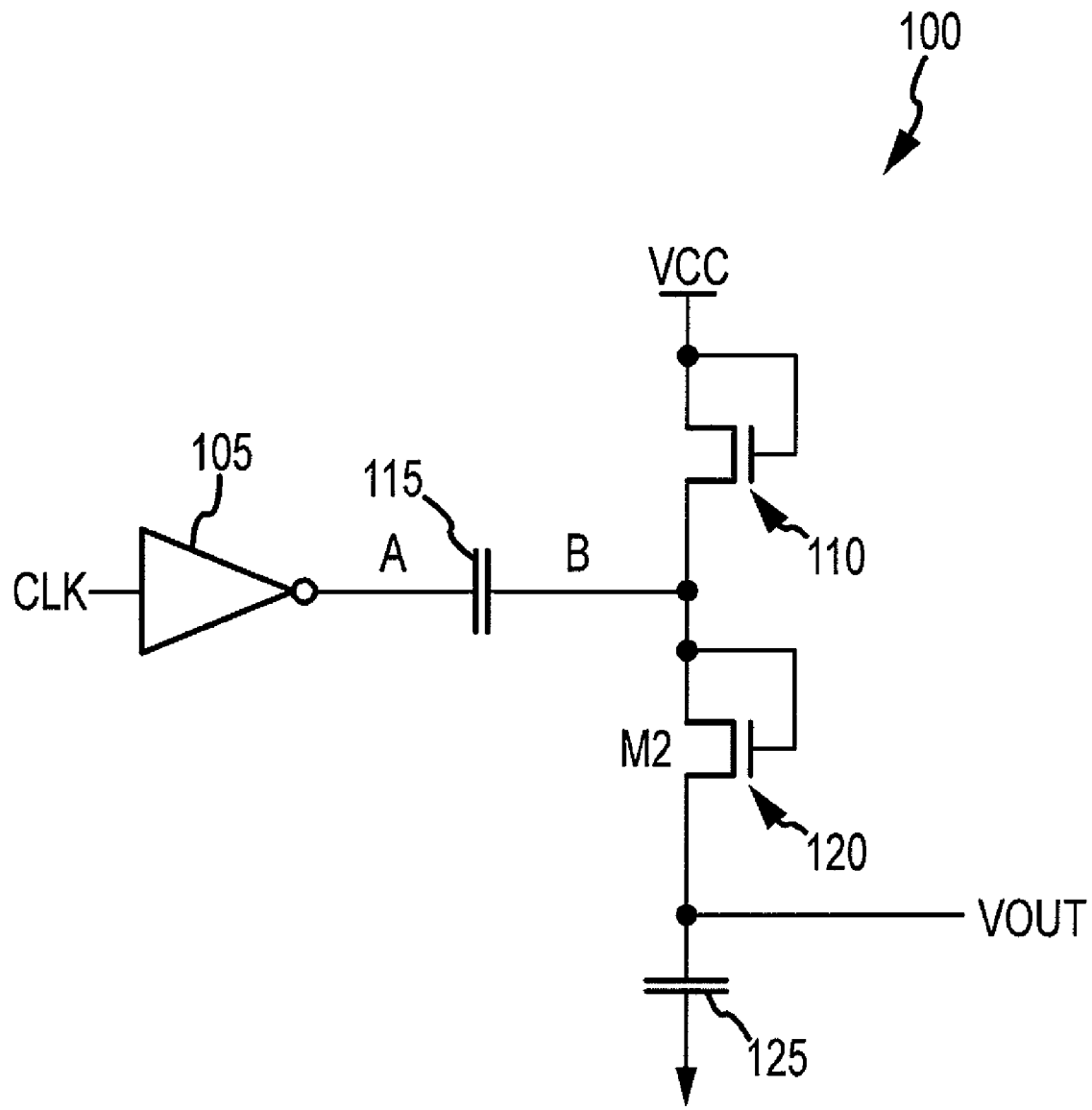
FIG. 1 is a schematic of a charge pump circuit according to the prior art.
Figure 2:
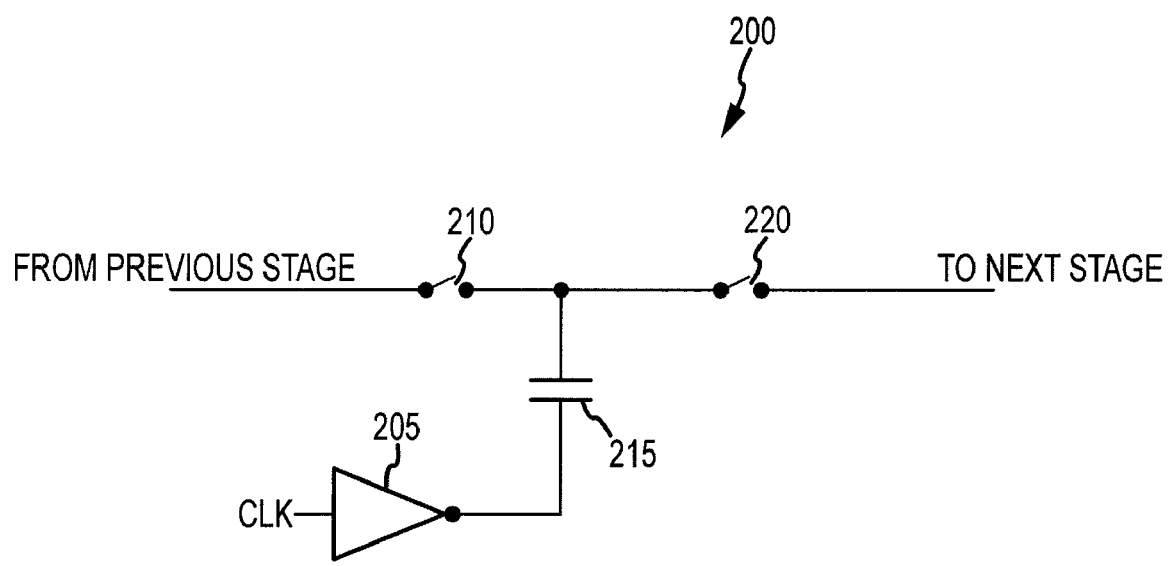
FIG. 2 is a schematic of a charge pump stage according to the prior art.

Each stage includes an individual charge pump, such as the charge pump circuit 200 shown in FIG. 2. Three switches 310, 311, and 312 are provided to select a number of stages for use in the charge pump 300. For example, if three-stage operation is desired, the switch 311 is closed, coupling the three stages 301, 302, and 303 in series. If two-stage operation is desired, the switch 311 is open and the switches 310 and 312 are closed, coupling the first stage 301 to a parallel combination of the second and third stages 302 and 303. The parallel combination of stages 302 and 303 can increase the current driving capacity of the charge pump circuit 300 when used in the two-stage configuration.

A pump stage selector 320 controls the operation of the charge pump 300 by coupling a signal indicative of the number of desired stages to the charge pump. For example, to control operation of the switches as described above, the pump stage selector 320 couples control signals to the switches 310, 311, and 312. A two stage enable signal ('2stgEN' in FIG. 3) causes the switches 310 and 312 to close while the switch 311 remains open, resulting in a two stage charge pump configuration. A three stage enable signal ('3stgEN' in FIG. 3) causes the switch 311 to close while the switches 310 and 312 remain open, resulting in a three stage charge pump configuration. The pump stage selector 320 may couple a control signal to the charge pump 300 corresponding to an input source voltage, an output driving requirement, an output voltage requirement, or combinations of these factors as described further below. In one example, the pump stage selector 320 may compare the supply voltage, $V_{CC}$ in FIG. 3, to a threshold value. When the supply voltage is lower than the threshold value, the pump stage selector 320 will couple a control signal to the charge pump to result in a higher stage configuration. When the supply voltage is higher than the threshold value, the pump stage selector 320 will couple a control signal to the charge pump to result in a lower stage configuration. In one example, the pump stage selector 320 couples the 3stgEN signal to the charge pump when $V_{CC}$ is less than 1.47 volts and the 2stgEN signal to the charge pump 300 when $V_{CC}$ is greater than 1.47 volts. However, the actual threshold voltage will vary based on circuit requirements and performance.

Appropriate selection should be made of a threshold condition for changing the number of pump stages in charge pump 300. A brief example of the theory behind this determination is included below to aid in understanding how the pump stage selector 320 may be designed to control the number of stages in the charge pump 300. Embodiments of the invention, however, are not bound by the theory below and deviations may be made to accommodate variations from ideal component behavior that occur in practice.

The charge pump 300 output, $V_{CCP}$, as generated by the variable number of stages, can be expressed as:

$$V_{CCP} = V_{CC} + K*(V_{single\text{-}stage\_out}); \quad (1)$$

where K is the number of pump stages and $V_{single\text{-}stage\_out}$ is the voltage output from a single pump stage. $V_{single\text{-}stage\_out}$ can be represented as:

$$V_{single\text{-}stage\_out} = V_{CC} - V_{margin}; \quad (2)$$

where $V_{margin}$ is the loss occurring at each pump stage. In practice, $V_{margin}$ may vary, but may be between $0.25V_{CC}$–$0.35V_{CC}$, so the value of $V_{single\text{-}stage\_out}$ varies from about $0.65$–$0.75V_{CC}$. Recall above, in the ideal case, the additional voltage added to an input voltage by a single stage is $V_{CC}$.

$V_{CCP}$ may also be set by a design and expressed as a certain amount, DeltaV, greater than the supply voltage $V_{CC}$:

$$V_{CC}P = V_{CC} + \text{Delta}V \quad (3)$$

For example, in one embodiment, $V_{CC}$ equals 1.5V and DeltaV equals 1.8V.

Combining equations (1) and (3), the pump stage selector 320 may compare:

$$K*(V_{single\text{-}stage\_out}) \text{ with DeltaV} \quad (4)$$

If the maximum $V_{CCP}$ output voltage, $K*(V_{CC}-V_{margin})$, is greater than DeltaV, a fewer number of charge pump stages is selected (two in the example of FIG. 3). Conversely, if $K*(V_{CC}-V_{margin})$ is smaller than DeltaV, a greater number of charge pump stages is selected (three in the example of FIG. 3). A variety of circuit configurations, stored memory values, or both, may be used by the pump stage selector 320 to make the comparison.

The above discussion has described a charge pump having a variable number of stages and begun to describe how to select the appropriate number of stages. While the number of stages can be selected to correspond to an absolute threshold voltage or other absolute circuit parameter, if the performance of the circuit changes responsive to process, voltage, or temperature variations, the absolute threshold may no longer be as accurate an indicator of the number of stages desired. In an embodiment described below, the number of stages is selected in a manner that is more insensitive to process, voltage and temperature variations.

A voltage regulator 330 may be coupled to the charge pump 300 to keep the output voltage $V_{CCP}$ within a set range. The regulator 330 is coupled to the charge pump 300 and couples a control signal to the charge pump 300 that turns the charge pump 300 on or off, for example, by turning on and off the clock signal used to drive the charge pump 300 as described above. The voltage regulator 330 may compare the output $V_{CCP}$ from the charge pump 300 with a reference voltage. In this manner, the voltage regulator 330 itself generates signals based on DeltaV. Intermediate signals generated in the voltage regulator 330 may be provided to the pump stage selector 320 to facilitate the comparisons described above without requiring additional or duplicative circuitry to be created for the pump stage selector. An example is described in more detail below.

Figure 4:
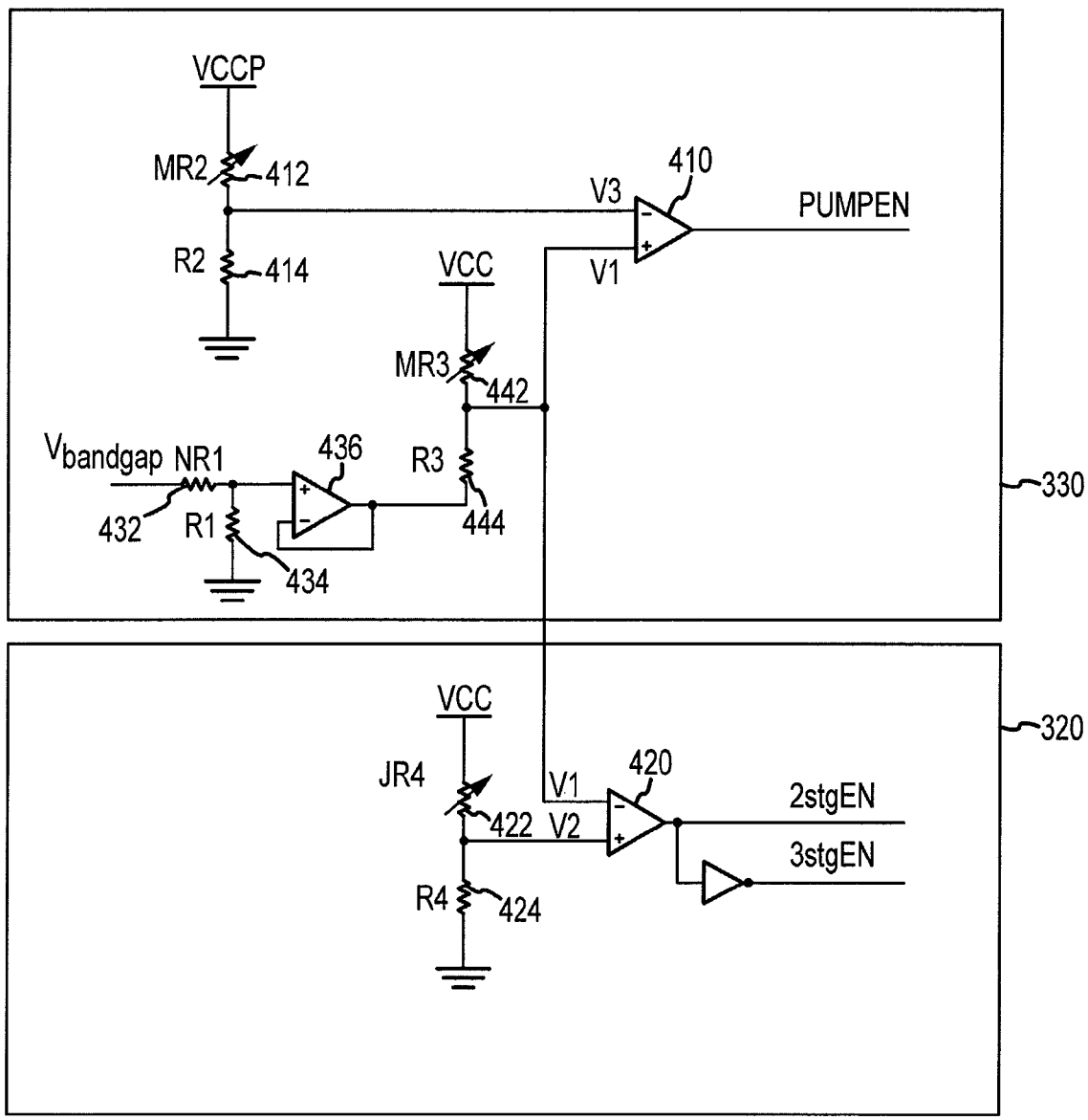
FIG. 4 is a schematic of the pump stage selector and voltage regulator of FIG. 3 according to an embodiment of the present invention.

FIG. 4 depicts an example of circuits used to implement the pump stage selector 320 and voltage regulator 330 of FIG. 3. The pump stage selector 320 includes a comparator 420. The comparator 420 receives two input signals, V1 and V2. When V2 is larger than V1, the pump stage selector outputs the signal 2stgEN to select the two-stage configuration for the charge pump 300 of FIG. 3. When V2 is smaller than V1, the pump stage selector 320 outputs the signal 3stgEN to select the three-stage configuration for the charge pump 300 of FIG. 3. The V2 signal is based on $V_{CC}$ and a resistor ratio between resistor 422 and 424. This ratio is shown as 'J' in FIG. 4. Accordingly, V2 may be expressed as:

$$V2 = V_{CC}/(J+1); \quad (5)$$

The resistor 422 may be a variable resistor, such that the ratio J may be altered by varying the resistance of resistor 422.

The signal V1 is generated by the voltage regulator 330. The voltage regulator 330 shown in FIG. 4 includes a comparator 410. The comparator receives and compares V1 and a third signal, V3. As shown, V1 is based on $V_{CC}$, the supply voltage for the charge pump 300, while V3 is based on $V_{CCP}$, the output voltage for the charge pump. By comparing the input and output, the regulator 330 can ensure a desired DeltaV value is maintained.

V3 is related to $V_{CCP}$ by the ratio of resistors 412 and 414. The ratio is depicted in FIG. 4 as 'M'. V3 may accordingly be expressed as:

$$V3 = V_{CCP}/(M+1); \quad (6)$$

V1 is based on the same resistor ratio, M, used to provide the signal V3. V1 also employs a reference voltage, $V_{bandgap}$. The reference voltage $V_{bandgap}$ can be created in any manner known in the art. In one embodiment, the $V_{bandgap}$ is 1.25 V. The reference voltage is divided by resistors 432 and 434 having a ratio N, and coupled through operational amplifier 436 to a resistor divider including resistors 442 and 444. The resistors 442 and 444 also have the ratio M. In both resistor pairs 412, 414 and 422, 424, one resistor is variable (shown as 412 and 422) such that the value of M may be adjusted. In practice, the value of M may be determined at a time the circuit is tested, and the circuitry trimmed accordingly. However, in other embodiments, the ratio M may be dynamically adjusted. The selection of the value of M will correspond to the desired DeltaV, as described further below.

Given the circuit topology shown in FIG. 4, V1 can be expressed as:

$$V1 = V_{CC}/(M+1) + V_{bandgap}*M/((N+1)(M+1)) \quad (7)$$

Recall Equation (3):

$$V_{CCP} = V_{CC} + \text{Delta}V \quad (3)$$

Accordingly, if M and N are selected such that DeltaV=$V_{bandgap}$*M/(N+1), V1 can be expressed as:

$$V1 = V_{CC}/(M+1) + \text{Delta}V/(M+1) \quad (8)$$

Recall V2=$V_{CC}$/(J+1); if J is selected such that:

$$J = (M+1)/((V_{CC} - V_{margin})*K/V_{CC} + 1) - 1; \text{ then} \quad (9)$$

$$V2 = V_{CC}/((M+1)/((V_{CC} - V_{margin})*K/V_{CC} + 1)) \quad (10)$$

The threshold condition for changing the configuration of the charge pump stages is when V1=V2. Equating equations (7) and (10), the condition V1=V2 occurs when DeltaV=$(V_{CC} - V_{margin})*K$, as described above.

The above description has provided a detailed description of providing signals to the pump stage selector 320. In the example provided above, the comparison made by the pump stage selector 320 at the comparator 420 is independent of the bandgap voltage used as a reference. Instead, resistor ratios are used to reflect the reference points. For example, the resistor ratio M is based on DeltaV while the resistor ratio J is based on the single-stage output value. In this manner, the circuit topology of FIG. 4 will be relatively unaffected by process and temperature variations, as well as bandgap voltage fluctuation.

While the examples described above focused on an embodiment of a charge pump circuit 300 having a two-stage and a three-stage configuration, substantially any number of stages may be provided and selected in a charge pump in accordance with embodiments of the present invention. A charge pump circuit having a one-, two- and three-stage configuration may, for example, be provided. A charge pump circuit having a one- and three-stage configuration may be provided. A charge pump circuit having a three- and four-stage configuration may be provided. A charge pump circuit having a one-, three-, and five-stage configuration may be provided. Any other variations in the number of selection of stages may also be made.

Figure 5:
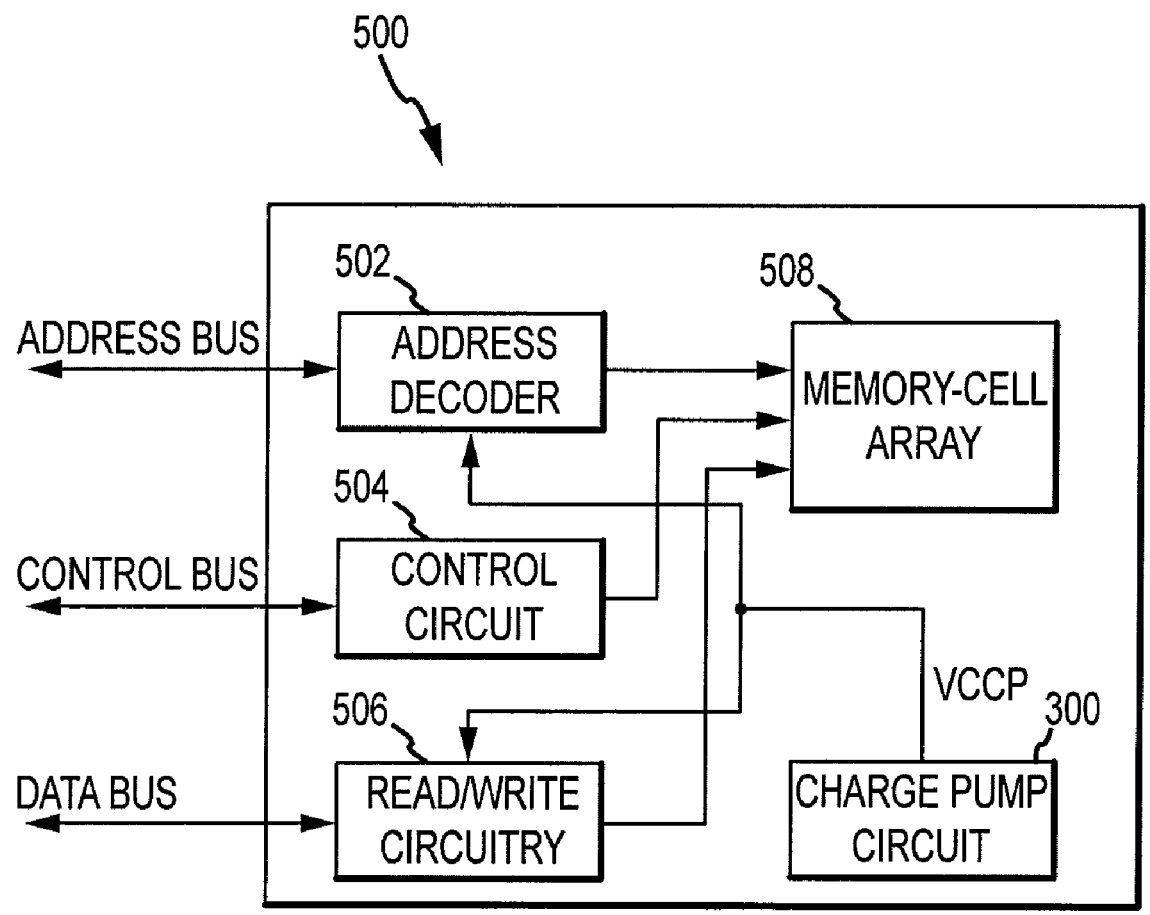
FIG. 5 is a schematic of a memory device according to an embodiment of the present invention.

FIG. 5 is a block diagram of a dynamic random access memory ("DRAM") 500 including the charge pump circuit 300 of FIG. 3. The DRAM 500 includes an address decoder 502, control circuit 504, and read/write circuitry 506 coupled to a memory-cell array 508, all of these components being conventional. In addition, the address decoder 502 is coupled to an address bus, the control circuit 504 is coupled to a control bus, and the read/write circuitry 506 is coupled to a data bus. The pumped output voltage $V_{CCP}$ generated by the charge pump circuit 300 may be applied to number of components within the DRAM 500, as understood by those skilled in the art. In the DRAM 500, the charge pump circuit 300 applies the pumped output voltage $V_{CCP}$ to the read/write circuitry 506 that may utilize this voltage in a data buffer (not shown) to enable that buffer to transmit or receive full logic level signals on the data bus. The charge pump circuit 300 also applies the pumped output voltage $V_{CCP}$ to the address decoder 502 which, in turn, may utilize this voltage to apply boosted word line voltages to the array 508. In operation, external circuitry, such as a processor or memory controller, applies address, data, and control signals on the respective busses to transfer data to and from the DRAM 500.

Although the charge pump circuit 300 is shown in the DRAM 500, one skilled in the art will realize the charge pump circuit 300 may be utilized in any type of integrated circuit requiring a pumped voltage, including other types of nonvolatile and volatile memory devices such as FLASH memories as well as SDRAMs, SRAMs, and packetized memory devices like SLDRAMs. When contained in a FLASH memory, the charge pump circuit 300 would typically receive an external programming voltage $V_{PP}$ and generate a boosted programming voltage that is utilized to erase the data stored in blocks of nonvolatile memory cells contained in the array 508, as will be understood by one skilled in the art.

Figure 6:
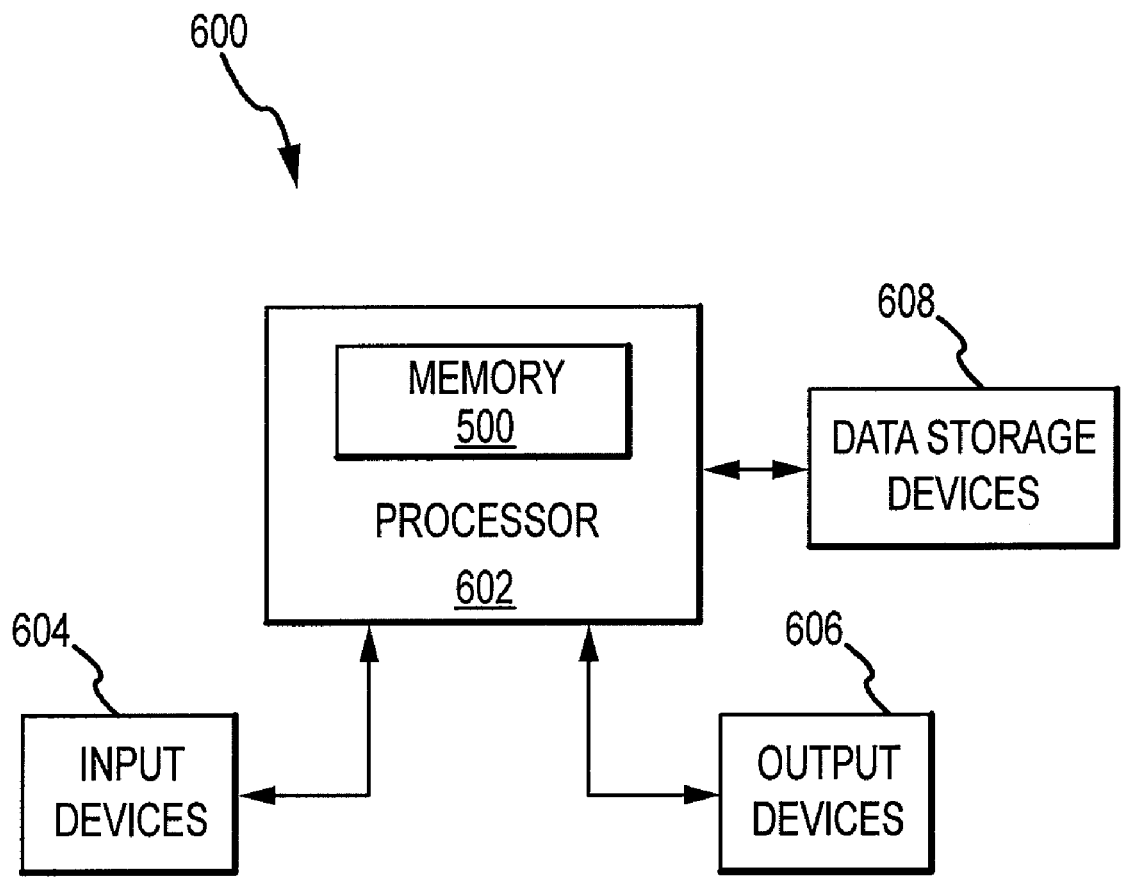
FIG. 6 is a schematic of a processor-based system according to an embodiment of the present invention.

FIG. 6 is a block diagram of a processor-based system 600 including processor 602 that contains or is coupled to the memory device 500 of FIG. 5, or other device containing charge pump circuit 300. The processor 602 performs various computing functions, such as executing specific software to perform specific calculations or tasks. In addition, the processor-based system 600 may include one or more input devices 604, such as a keyboard or a mouse, coupled to the processor 602. The processor-based system 600 may also include one or more output devices 606 coupled to the processor 602, such as a printer or display. One or more data storage devices 608 may also be coupled to the processor 602 to store data or retrieve data from external storage media (not shown). Examples of typical storage devices 608 include hard and floppy disks, tape cassettes, and compact disc read-only memories (CD-ROMs). The processor 602 may be coupled to the memory device 500 through appropriate address, data, and control busses to provide for writing data to and reading data from the memory device.

The processor-based system 600 shown in FIG. 6 may be used in any of a variety of products employing processors and memory including for example cameras, phones, wireless devices, displays, chip sets, set top boxes, gaming systems, vehicles, and appliances. Resulting devices employing the processor-based system 600 may benefit from the charge pump circuitry described above to perform their ultimate user function.

From the foregoing it will be appreciated that, although specific embodiments of the invention have been described herein for purposes of illustration, various modifications may be made without deviating from the spirit and scope of the invention.

What is claimed is:

1. A variable stage charge pump configured to receive an input voltage and output a pumped voltage different than the input voltage, the variable stage charge pump comprising:

an input port configured to receive the input voltage;

an output port configured to output the pumped voltage;
a plurality of charge pump stages, including a first, second, and third stage, each stage configured to receive a respective input voltage and generate a respective pumped voltage therefrom and provide the pumped voltage to a respective output terminal;
the first, second, and third stages are coupled in series between the input port and the output port in a first configuration, and, in a second configuration, the second and third stages are coupled in parallel and the parallel combination serially coupled to the first stage such that an output of the first stage is coupled to an input of the second stage and an input of the third stage to provide the pumped voltage from the first stage to the second and third stages concurrently.

2. The variable stage charge pump according to claim 1 wherein the plurality of switches includes a first switch between an output of the second stage and the output port, a second stage between an output of the first stage and an input of the third stage, and a third switch between an output of the second stage and an input of the third stage, the first configuration comprising the first and second switches in an open position and the third switch in a closed position, the second configuration comprising the first and second switches in a closed position and the third switch in an open position.

3. The variable stage charge pump according to claim 1 wherein each of the plurality of stages comprises a charging capacitor configured to charge from the respective input voltage and couple stored charge to a next stage.

4. The variable stage charge pump according to claim 3 wherein the charging capacitor of the first stage is larger than the charging capacitors of the second and third stages.

5. The variable stage charge pump according to claim 1 further comprising a pump stage selector coupled to the plurality of switches, the pump stage selector configured to select a configuration of the first and second configurations based at least in part on the input voltage.

6. The variable stage charge pump according to claim 5 wherein the pump stage selector is further configured to select the configuration based at least in part on an output current of the variable stage charge pump.

7. The variable stage charge pump according to claim 5 wherein the output pumped voltage of the variable stage charge pump is greater than the input voltage by a difference amount and each of the plurality of charge pump stages are configured to increase their respective input voltages by an incremental amount, the pump stage selector configured to select the configuration based at least in part on the incremental amount and the difference amount.

8. The variable stage charge pump according to claim 7 wherein the pump stage selector is configured to select the configuration of the plurality of switches based on a comparison of the number of stages multiplied by the respective output voltage with the difference amount.

9. A memory device comprising:
an address bus;
a control bus;
a data bus;
an address decoder coupled to the address bus;
a read or write circuit coupled to the data bus;
an array of memory cells coupled to the address decoder, control circuit and read or write circuit; and
a variable stage charge pump configured to receive an input voltage and output a pumped voltage different than the input voltage, the pumped voltage coupled to at least one of the address decoder, read or write circuit, and array or memory cells, the variable stage charge pump comprising:
an input port configured to receive the input voltage;
an output port configured to output the pumped voltage;
a plurality of charge pump stages, including a first, second, and a third stage, each stage configured to receive a respective input voltage and generate a respective pumped voltage therefrom and provide the pumped voltage to a respective output terminal; and
a plurality of switches coupled to the plurality of charge pump stages such that, in a first configuration, the first, second, and third stages are coupled in series between the input port and the output port and, in a second configuration, the second and third stages are coupled in parallel and the parallel combination serially coupled to the first stage such that an output of the first stage is coupled to an input of the second stage and an input of the third stage to provide the pumped voltage from the first stage to the second and third stages concurrently.

10. The memory device of claim 9 wherein the memory device comprises a DRAM and the pumped voltage is coupled to the address decoder which is configured to utilize the boosted voltage to apply boosted word line voltages to the array of memory cells.

11. The memory device of claim 9 wherein the memory device comprises a flash memory and the control circuit is configured to apply the pumped voltage to erase data stored in blocks of the array of memory cells or to program data into the array of memory cells.

12. A processor-based system comprising:
a data input device;
a data output device; and
a processor coupled to the data input and output devices, the processor including a memory device comprising:
an address bus;
a control bus;
a data bus;
an address decoder coupled to the address bus;
a read or write circuit coupled to the data bus;
an array of memory cells coupled to the address decoder, control circuit and read or write circuit; and
a variable stage charge pump configured to receive an input voltage and output a pumped voltage different than the input voltage, the pumped voltage coupled to at least one of the address decoder, read or write circuit, and array or memory cells, the variable stage charge pump comprising:
an input port configured to receive the input voltage;
an output port configured to output the pumped voltage;
a plurality of charge pump stages, including a first, second, and third stage, each stage configured to receive a respective input voltage and generate a respective pumped voltage therefrom and provide the pumped voltage to a respective output terminal; and
a plurality of switches coupled to the plurality of charge pump stages such that, in a first configuration, the first, second, and third stages are coupled in series between the input port and the output port and, in a second configuration, the second and third stages are coupled in parallel and the parallel combination serially coupled to the first stage such that an output of the first stage is coupled to an input of the second stage and an input of the third stage to provide the pumped voltage from the first stage to the second and third stages concurrently.

13. A method for providing a boosted output voltage greater than an input voltage by a difference amount, the method comprising:

receiving a first signal corresponding to the difference amount;

receiving a second signal corresponding to a single-stage boosted voltage generated by a single stage of a variable stage charge pump;

comparing the first and second signals; and controlling a plurality of switches, based at least in part on the comparison, to couple at least two stages of the variable stage charge pump in parallel to generate the boosted output voltage such that an output of a first stage of the charge pump is coupled to the input of the at least two stages to provide a pumped voltage from the first stage to the at least two stages concurrently.

14. The method according to claim 13 wherein the act of selecting the configuration comprises selecting between a smaller number of stages and a larger number of stages, and the act of selecting comprises selecting the smaller number of stages when the larger number of stages multiplied by the single-stage boosted voltage is larger than the difference amount and selecting the larger number of stages when the smaller number of stages multiplied by the single-stage boosted voltage is smaller than the difference amount.

15. The method according to claim 13 further comprising:

coupling the input voltage to an input of the series combination of the selected number of stages;

coupling a clock signal to a control terminal of each of the selected number of stages;

charging a capacitor in each of the respective number of stages during a first portion of the clock signal; and generating the boosted output voltage by coupling the respective charged capacitors to an output terminal of each respective stage.

16. The method according to claim 15 further comprising:

regulating the boosted output voltage by turning the clock signal on and off to maintain the boosted output voltage the difference amount greater than the input voltage.

17. The method according to claim 13 wherein the act of selecting the arrangement comprises selecting a configuration having a first number of stages when the input voltage is less than a threshold value and selecting a configuration having a second number of stages when the input voltage is greater than the threshold value.

\* \* \* \* \*

UNITED STATES PATENT AND TRADEMARK OFFICE
CERTIFICATE OF CORRECTION

| | | |
|---|---|---|
| PATENT NO. | : 7,956,673 B2 | Page 1 of 1 |
| APPLICATION NO. | : 12/189532 | |
| DATED | : June 7, 2011 | |
| INVENTOR(S) | : Dong Pan | |

It is certified that error appears in the above-identified patent and that said Letters Patent is hereby corrected as shown below:

Title page, Item (74), "Attorney, Agent, or Firm" delete "Dorsey & Witney LLP" and insert
   -- Dorsey & Whitney LLP --, therefor.

Signed and Sealed this
Ninth Day of August, 2011

David J. Kappos
*Director of the United States Patent and Trademark Office*